United States Patent
Tsubota et al.

(10) Patent No.: US 7,818,105 B2
(45) Date of Patent: Oct. 19, 2010

(54) VEHICLE INSPECTION MANAGEMENT SYSTEM AND METHOD

(75) Inventors: Tomohiro Tsubota, Nagoya (JP); Norichika Kimura, Nagoya (JP); Shigeo Kambe, Okazaki (JP)

(73) Assignees: Mitsubishi Jidosha Engineering Kabushiki Kaisha, Okazaki-Shi (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 249 days.

(21) Appl. No.: 11/090,197

(22) Filed: Mar. 28, 2005

(65) Prior Publication Data

US 2005/0216152 A1    Sep. 29, 2005

(30) Foreign Application Priority Data

Mar. 29, 2004    (JP)    ............................ 2004-096547

(51) Int. Cl.
*G01M 17/00*    (2006.01)
*G06F 11/30*    (2006.01)
*G21C 17/013*    (2006.01)
*F02P 17/00*    (2006.01)

(52) U.S. Cl. ........................... 701/33; 382/141; 701/29; 701/35; 702/33; 702/34; 702/35; 702/57; 702/68; 702/81; 702/183; 324/378; 324/394

(58) Field of Classification Search .................... 701/33, 701/29, 30; 340/438; 702/33, 113, 155
See application file for complete search history.

(56) References Cited

U.S. PATENT DOCUMENTS

| | | | |
|---|---|---|---|
| 5,036,479 A | | 7/1991 | Prednis et al. |
| 5,717,595 A | * | 2/1998 | Cherrington et al. ........ 705/400 |
| 5,754,451 A | * | 5/1998 | Williams ..................... 702/185 |
| 5,839,112 A | * | 11/1998 | Schreitmueller et al. ....... 705/4 |
| 5,968,108 A | * | 10/1999 | Takakura et al. ............ 701/102 |
| 6,070,155 A | | 5/2000 | Cherrington et al. |
| 6,181,992 B1 | * | 1/2001 | Gurne et al. .................. 701/29 |
| 6,324,749 B1 | * | 12/2001 | Katsuura et al. .............. 29/703 |
| 6,370,454 B1 | * | 4/2002 | Moore .......................... 701/29 |
| 6,417,760 B1 | * | 7/2002 | Mabuchi et al. .............. 340/5.3 |

(Continued)

FOREIGN PATENT DOCUMENTS

CN    1436683    8/2003

(Continued)

*Primary Examiner*—Jack Keith
*Assistant Examiner*—Jonathan M Dager
(74) *Attorney, Agent, or Firm*—Birch, Stewart, Kolasch & Birch, LLP (57) ABSTRACT

When the mobile inspection terminal determines that the inspection standard information received from a server is the "specification", it displays the received inspection standard information and out-of-standard specification information on a liquid crystal display. When it is confirmed in this state that selected inspection standard information is input, whether or not an part to be inspected is acceptable is determined based on the inspection standard information, and the server is notified of a result of determination. Further, when it is determined that the inspection standard information is the "measured value", a measured value input screen is displayed on the liquid crystal display. When it is confirmed in this state that a measured value is input, whether or not the part to be inspected is acceptable or not is determined based on the input information, and the server is notified of a result of determination.

6 Claims, 4 Drawing Sheets

U.S. PATENT DOCUMENTS

| | | |
|---|---|---|
| 6,516,239 B1 | 2/2003 | Madden et al. |
| 6,560,516 B1 * | 5/2003 | Baird et al. .................. 701/23 |
| 6,772,027 B2 * | 8/2004 | Kurihara ..................... 700/99 |
| 6,795,754 B2 * | 9/2004 | Sunami et al. ................. 701/1 |
| 6,876,950 B2 * | 4/2005 | Beney et al. ................ 702/183 |
| 6,915,571 B2 * | 7/2005 | Hosono et al. ............. 29/897.2 |
| 6,917,890 B2 * | 7/2005 | Davis et al. .................. 702/85 |
| 6,985,786 B2 * | 1/2006 | Wright ...................... 700/115 |
| 7,048,185 B2 * | 5/2006 | Hart .......................... 235/384 |
| 7,092,803 B2 * | 8/2006 | Kapolka et al. ............... 701/29 |
| 7,127,409 B2 * | 10/2006 | Denning et al. ................ 705/7 |
| 7,287,188 B2 * | 10/2007 | Shibata et al. ................ 714/21 |
| 7,493,112 B2 * | 2/2009 | Adachi et al. ............... 455/420 |
| 2002/0016655 A1 * | 2/2002 | Joao ........................... 701/35 |
| 2002/0103620 A1 * | 8/2002 | Hayashi et al. ............. 702/182 |
| 2002/0116103 A1 * | 8/2002 | Matsunaga et al. ........... 701/29 |
| 2002/0122583 A1 * | 9/2002 | Thompson .................. 382/141 |
| 2002/0161496 A1 | 10/2002 | Yamaki |
| 2002/0178147 A1 * | 11/2002 | Arroyo et al. .................. 707/2 |
| 2002/0198618 A1 * | 12/2002 | Madden et al. ............. 700/101 |
| 2003/0081825 A1 * | 5/2003 | Mitterholzer ............... 382/141 |
| 2003/0176939 A1 | 9/2003 | Yoshida et al. |
| 2004/0172177 A1 * | 9/2004 | Nagai et al. .................. 701/29 |
| 2004/0254689 A1 * | 12/2004 | Blazic et al. ................... 701/1 |
| 2005/0131596 A1 * | 6/2005 | Cherrington et al. .......... 701/29 |
| 2005/0145794 A1 * | 7/2005 | Faubion ...................... 250/330 |

FOREIGN PATENT DOCUMENTS

| | | |
|---|---|---|
| DE | 4207354 C2 | 3/1994 |
| DE | 19725916 A1 | 1/1999 |
| EP | 1291795 A1 | 3/2003 |
| GB | 2352692 A | 2/2001 |
| JP | 63-61133 A | 3/1988 |
| JP | 7-182423 A | 7/1995 |
| JP | 2002-12177 A | 1/2002 |
| JP | 2003-157108 | 5/2003 |
| JP | 2003-287476 A | 10/2003 |
| JP | 2003-295934 | 10/2003 |

* cited by examiner

VEHICLE INSPECTION MANAGEMENT SYSTEM AND METHOD

CROSS-REFERENCE TO RELATED APPLICATIONS

This application is based upon and claims the benefit of priority from prior Japanese Patent Application No. 2004-096547, filed Mar. 29, 2004, the entire contents of which are incorporated herein by reference.

BACKGROUND OF THE INVENTION

1. Field of the Invention

The present invention relates to a vehicle inspection management system and method in a vehicle manufacturing line.

2. Description of the Related Art

Heretofore, there is known a system in which a plurality of inspection processes are applied to finished vehicles in a vehicle manufacturing line, and in the respective inspection processes inspection data is downloaded from a host computer to a personal computer, an inspection worker (hereinafter, abbreviated as "inspection worker") executes inspections based on the inspection data, and a result of the inspection is input to the personal computer and transmitted to the host computer.

Further, there is also known a system in which, at the beginning of inspection, an inspection instruction sheet, on which reference data necessary for the inspections executed in the respective inspection processes is printed using bar codes, is attached to a finished vehicle, reference data is obtained by reading a corresponding bar code in a first process, and an inspection is executed based on the reference data, and a result of the inspection is issued in the form of a bar code label which is adhered to the inspection instruction sheet and transferred to a next process (Jpn. Pat. Appln. KOKAI Publication No. 2002-12177).

However, in the systems in which inspections are executed to a finished vehicle as described above, when a part is replaced because its specification is not proper, a problem arises in that even a part whose specification is proper must also be removed, which requires a very troublesome job.

To cope with the above problem, there is employed a system in which a plurality of processes are provided in a vehicle manufacturing line, an inspection worker visually inspects a part using an inspection sheet, on which an inspection standard value of the part set based on the proper specification of the part is recorded, in each process and records a result of the inspection on the inspection sheet, and if the specification of the part is not proper, the part is corrected in the process.

However, in the system in which the inspection sheet, on which the inspection standard value is previously recorded, is used, there is a possibility that a decision of acceptance is erroneously made by an inspection worker in such a case that the worker erroneously accepts a part to be inspected by approving it on the inspection sheet regardless that the specification of the part is different from a proper one.

The present invention provides a vehicle inspection management system and method capable of improving an inspection accuracy by preventing a decision of acceptance erroneously made by an inspection worker.

BRIEF SUMMARY OF THE INVENTION

According to one aspect of the present invention, there is provided a vehicle inspection management system comprising:

a server for use in a vehicle manufacturing line, the server being provided with a database having inspection standard information stored therein; and inspection terminals which communicate with the server through a LAN and which are used in a plurality of inspection processes, wherein the server comprises:

inspection information transmission section configured to read out the inspection standard information of a vehicle from the database and transmitting the inspection standard information of the vehicle to one of the inspection terminals, and each of the inspection terminals comprises:

a display;

first display section configured to display an inspection item screen on the display;

second display section configured to, when it receives the inspection standard information from the server, display an inspection information input screen on the display in the state in which the inspection standard information is masked; and notification section configured to determine, when a inspection worker in charge of inspection inputs a result of inspection of a section to be inspected on the inspection information input screen, whether or not the section is accepted based on the inspection standard information and notifying the server of a result of determination.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be explained below with reference to the drawings.

Figure 1:
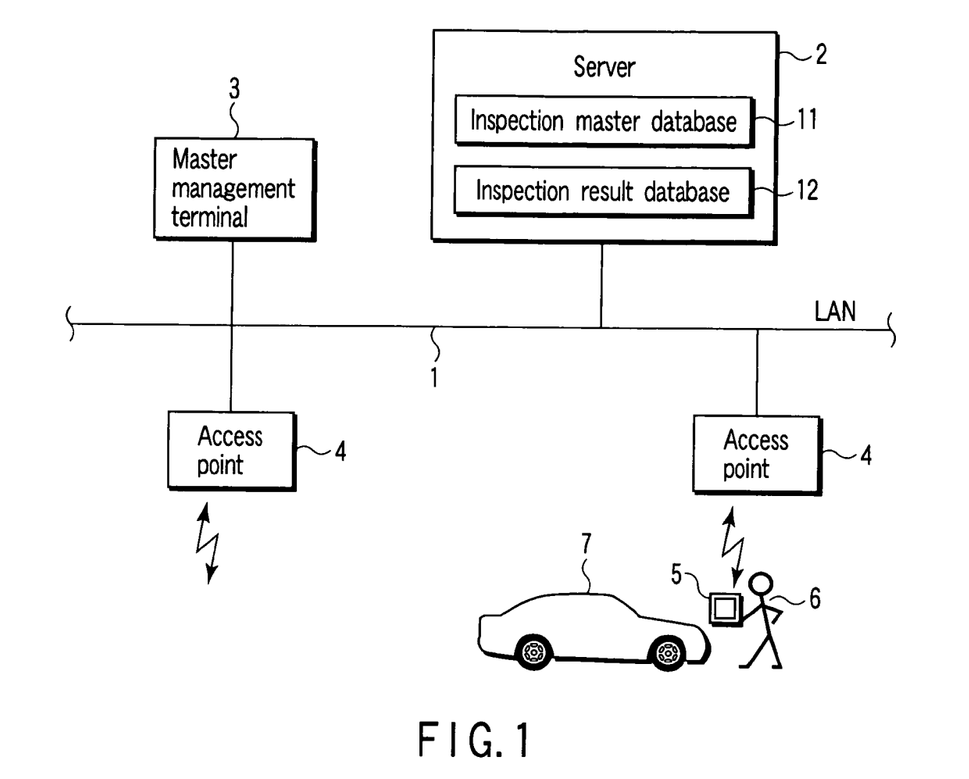
FIG. 1 is a diagram showing a vehicle inspection management system according to an embodiment of the present invention.

FIG. 1 is a diagram showing the arrangement of a vehicle inspection management system, in which a server 2 and a master management terminal 3 are connected to a LAN 1 disposed in a vehicle manufacturing factory and a plurality of access points 4 are connected to the LAN 1 at predetermined intervals. Radio communications are executed with mobile inspection terminals 5 acting as inspection terminals located in the vicinity of the access points 4 through the access points 4.

The mobile inspection terminals 5 are carried by inspection workers 6, and each time a predetermined process is finished in a manufacturing line, an inspection worker 6 inspects a plurality of sections and parts to be inspected, which are assembled on a vehicle 7, in the process and by manipulating a mobile inspection terminal 5.

The server 2 is provided with an inspection master database 11 and an inspection result database 12. The inspection master database 11 includes the inspection standard specification information, the measured values of inspection standards, and the like of sections and parts to be inspected of respective vehicles to be manufactured, in addition to the identification codes, models, and the like of the vehicles. The inspection result database 12 stores the results of inspections executed in the respective processes, the codes of inspection workers executed the inspections, the times required for the inspections, and the like which are received by the server 2 from the mobile inspection terminals 5.

Figure 2:
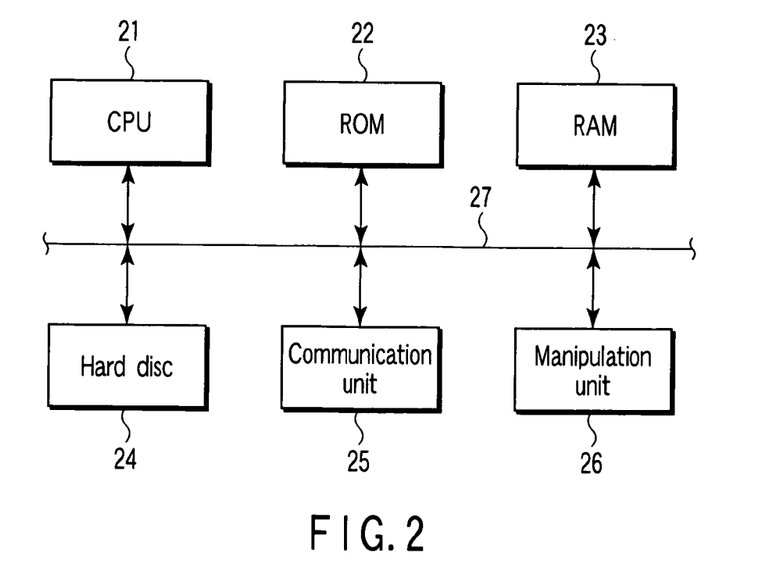
FIG. 2 is a block diagram showing a hardware arrangement of a server of the embodiment.

As shown in FIG. 2, the server 2 is provided with a CPU (central processing unit) 21, a ROM (read only memory) 22, a RAM (random access memory) 23, a hard disc device 24, a communication unit 25, and a manipulation unit 26, and they are electrically connected to each other through a bus line 27. The CPU 21 constitutes a controller main body, the ROM 22 stores program data through which the CPU 21 controls respective components, the RAM 23 includes a memory temporarily used by the CPU 21 when it transmits and receives data, processes data, and the like, the hard disc device 24 stores the inspection master database 11, the inspection result database 12, and the like, the communication unit 25 transmits and receives data to and from the master management terminal 3 through the LAN 1 as well as transmits and receives data to and from the mobile inspection terminals 5 through the LAN 1 and the access points 4, and the manipulation unit 26 is used to input data through keys, display indicators, and the like.

Figure 3:
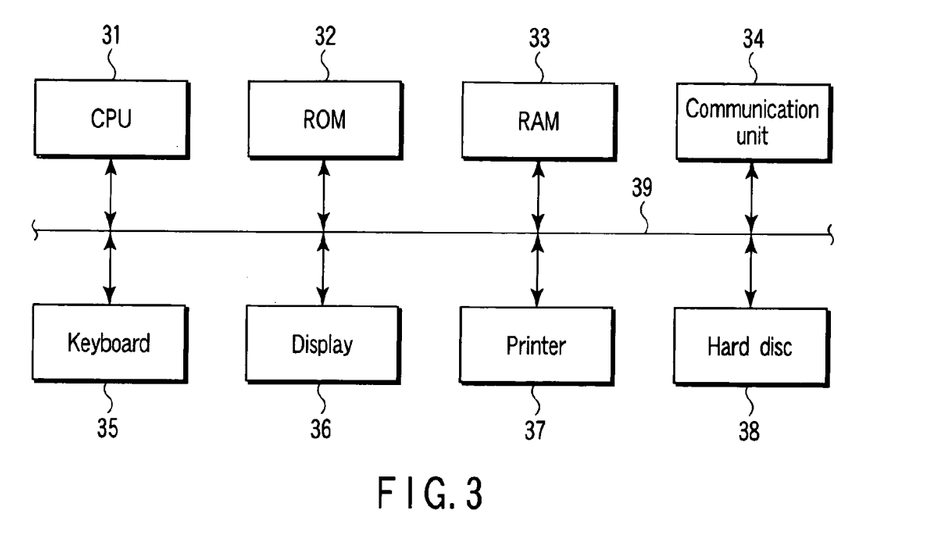
FIG. 3 is a block diagram showing a hardware arrangement of a master management terminal of the embodiment.

The master management terminal 3 is a terminal manipulated by a manager of the manufacturing line. As shown in FIG. 3, the master management terminal 3 is provided with a CPU 31, a ROM 32, a RAM 33, a communication unit 34, a keyboard 35, a display 36, a printer 37, and a hard disc device 38, and they are electrically connected to each other through a bus line 39. The CPU 31 constitutes a controller main body, the ROM 32 stores program data through which the CPU 31 controls respective components, the RAM 33 includes a memory temporarily used by the CPU 31 when it transmits and receives data, processes data, and the like, a memory for storing a small amount of data, and the like, the communication unit 34 transmits and receives data to and from the server 2 through the LAN 1, the keyboard 35 includes various keys for executing jobs, the display 36 is a liquid crystal display and the like and displays data and the like, the printer 37 prints and outputs necessary data, and the hard disc device 38 is used to store a large amount of data.

Figure 4:
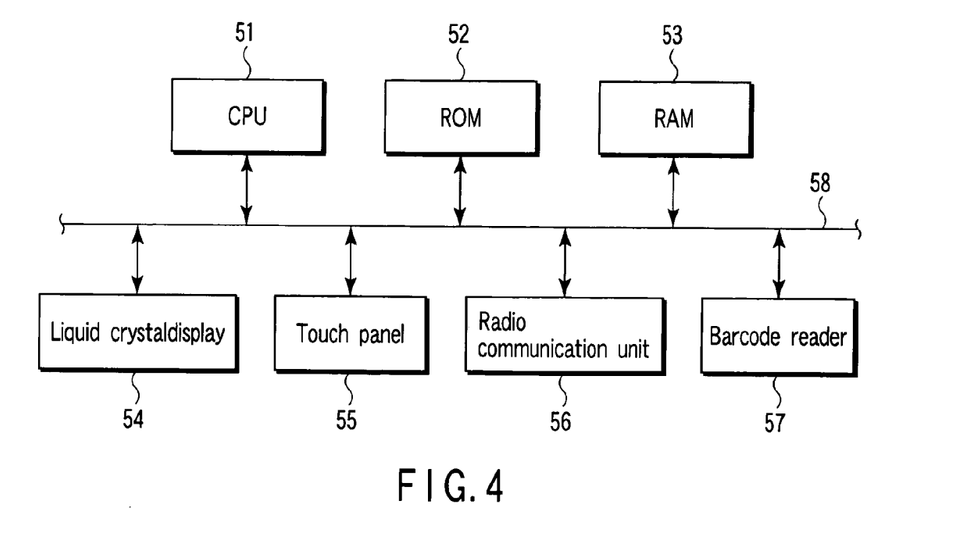
FIG. 4 is a block diagram showing a hardware arrangement of a mobile inspection terminal of the embodiment.

As shown in FIG. 4, the mobile inspection terminals 5 is provided with a CPU 51, a ROM 52, a RAM 53, a liquid crystal display 54, a touch panel 55, a radio communication unit 56, and a barcode reader 57, and they are electrically connected to each other through a bus line 58. The CPU 51 constitutes a controller main body, the ROM 52 stores program data through which the CPU 51 controls respective components, the RAM 53 includes a memory temporarily used by the CPU 51 when it transmits and receives data, processes data, and the like, a memory for storing a small amount of data, and the like, the liquid crystal display 54 displays data, input screens on which various information is input, and the like, the touch panel 55 is placed on the liquid crystal display 54 through which information is input on an input screen displayed on the liquid crystal display 54, the radio communication unit 56 transmits and receives data to and from the access points 4 by a radio communication, and the barcode reader 57 reads a barcode of a label bonded to a section to be inspected.

The master management terminal 3 displays a master data input screen on the display 36, and the manager inputs inspection information of the sections and parts of the respective vehicles to be manufactured, which are inspected in the respective processes, and the contents of inspections executed in the respective processes through the master management terminal 3, and the information input here is stored in the inspection master database 11 of the server 2.

When the inspection information in the respective processes to the vehicles to be manufactured is set to the inspection master database 11 of the server 2, the mobile inspection terminals 5 make a radio communication with the server 2 in the respective processes based on the inspection information, and inspection workers 6 carrying the mobile inspection terminals 5 execute inspection.

Figure 5:
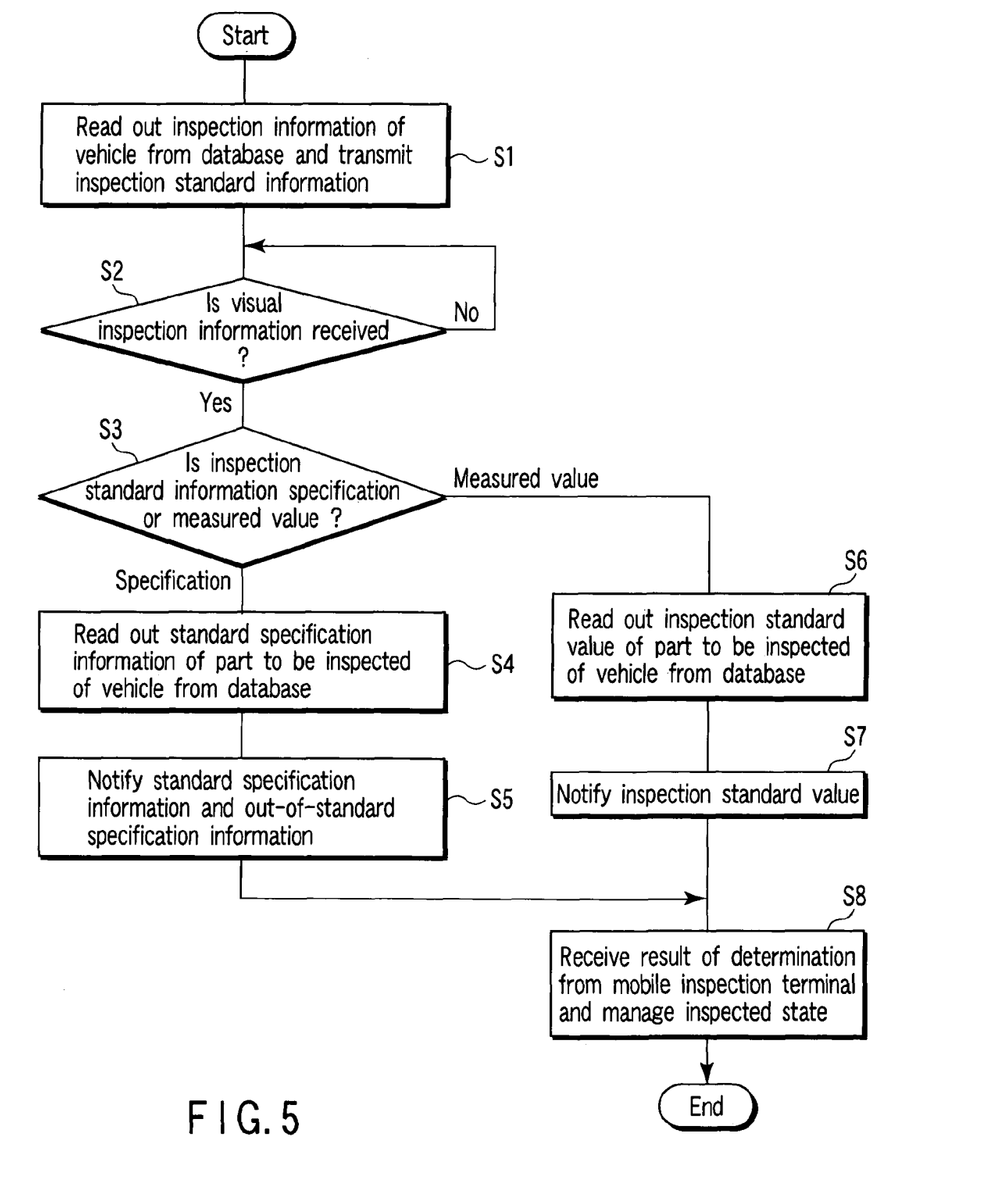
FIG. 5 is a flowchart showing main processing, executed by the server of the embodiment.
Figure 6:
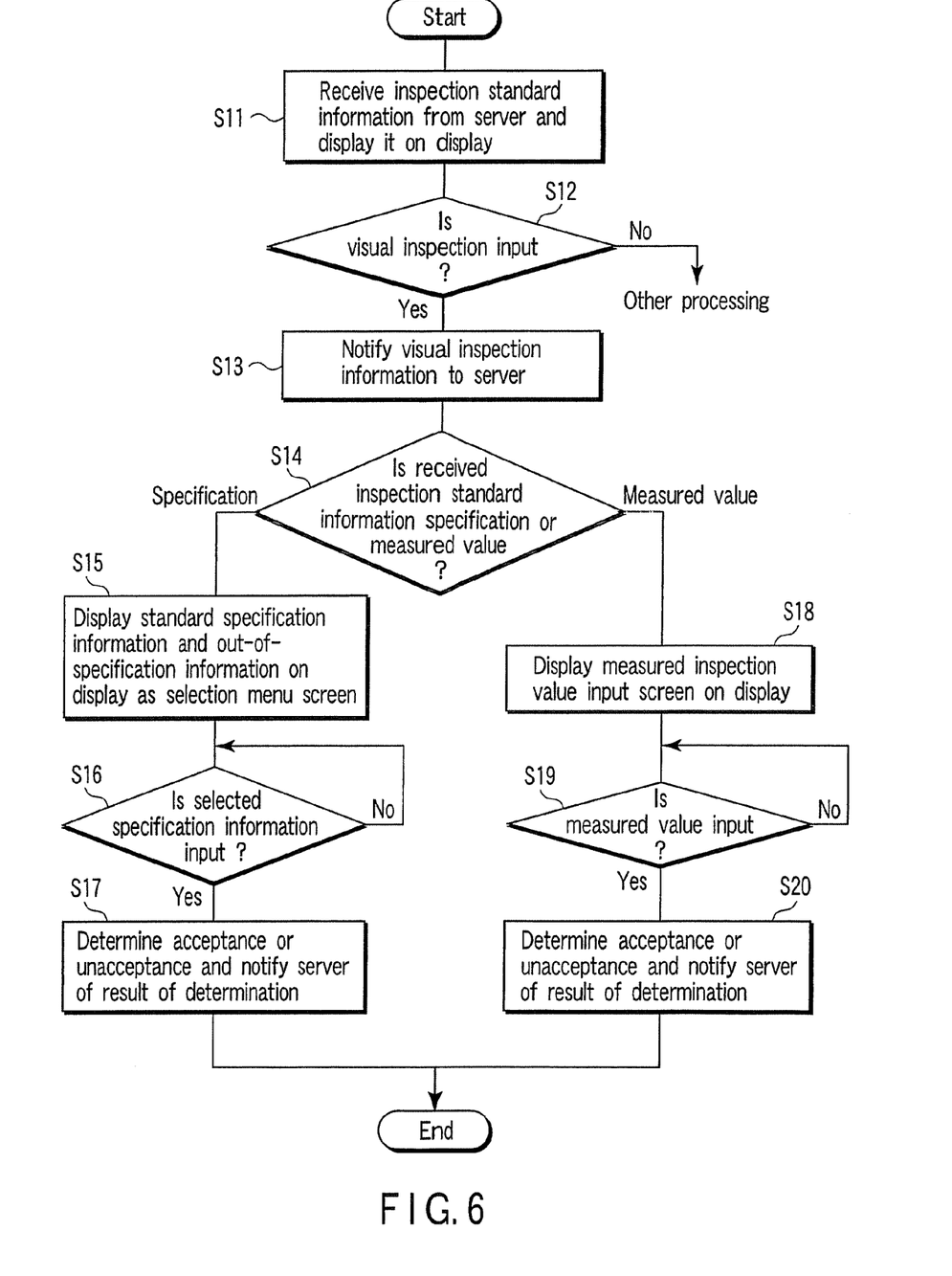
FIG. 6 is a flowchart showing main processing executed by the mobile inspection terminal of the embodiment.

During the inspection, the server 2 executes processing based on a flowchart shown in FIG. 5, and the mobile inspection terminals 5 executes processing based on a flowchart shown in FIG. 6. More specifically, when the server 2 receives an ID code for specifying a vehicle to be inspected and a process of the vehicle from a mobile inspection terminal 5, it reads out in step S1 inspection standard information applied to the vehicle in the process from the inspection master database 11 and transmits it to the mobile inspection terminal 5 (inspection information transmission means).

When the mobile inspection terminal 5 receives the inspection standard information from the server 2 in step S11, it creates an inspection item screen and displays it on the liquid crystal display 54 (first display means).

When a particular button is clicked on the inspection item screen, it is determined to input a visual inspection in step S12, and thus the server 2 is notified of visual inspection information in step S13 (notification means).

When the server confirms that it has received the visual inspection information from the mobile inspection terminal 5 in step S2, it subsequently determines whether the inspection standard information is a "specification" or a "measured value". When, for example, the "specification" is designated, the server 2 reads out in step S4 the inspection standard specification information of a section to be inspected of the vehicle from the inspection master database 11. It step S5, the server 2 notifies the mobile inspection terminal 5 of specifications created by adding out-of-standard specification information to the inspection standard specification as inspection standard information.

Further, when the inspection standard information is the "measured value" in step S3, the server 2 reads out in step S6 the inspection standard measured value of the section to be inspected of the vehicle from the inspection master database 11. Then, the server 2 notifies in step S7 the mobile inspection terminal 5 of the thus read inspection standard measured value as the inspection standard information.

On receiving the inspection standard information from the server 2 in step S14, the mobile inspection terminal 5 determines whether the inspection standard information is the "specification" or the "measured value". When the mobile inspection terminal 5 determines that the inspection standard information is the "specification", it displays in step S15 the received inspection standard specification information and out-of-standard specification information on the liquid crystal display 54 as a selection menu screen (second display means).

When the mobile inspection terminal 5 confirms in step S16 that a selected specification is input, it determines whether or not the inspected section is acceptable and notifies the server 2 of the result of determination (notification means).

Further, when the mobile inspection terminal 5 determines that the received inspection standard information is the "measured value", the mobile inspection terminal 5 displays a measured inspection value input screen on the liquid crystal display 54 in step S18 (second display means).

When the mobile inspection terminal 5 confirms that a measured value is input in step S19, it determines in step S20 whether or not the inspected section is acceptable and notifies the server 2 of the result of determination (notification means).

The server 2 receives in step S8 the result of determination from the mobile inspection terminal 5, stores it to the inspection result database 12 as an inspected state together with the code of an inspection worker who inspected the section and manages them.

In the above arrangement, when, for example, a tire brand is inspected in a process, the mobile inspection terminal 5 notifies the server 2 of data and the like showing the ID code and a process of a vehicle to be inspected, receives inspection standard information, and displays an inspection item screen on the liquid crystal display 54. When a particular button is clicked on the inspection item screen, the mobile inspection terminal 5 receives inspection standard specification information and out-of-standard specification information set in response to the manipulation of the button from the server 2, and displays it on the liquid crystal display 54.

The inspection worker visually confirms the tire brand of the vehicle and selects and inputs the specification information corresponding to the visually confirmed tire brand from the plurality of specification information displayed on the liquid crystal display 54. The mobile inspection terminal 5 determines whether or not the specification information selected and input as described above is the normal specification information set to the vehicle. That is, the mobile inspection terminal 5 determines whether or not the selected specification information is a standard specification information or an out-of-standard specification information. When the selected specification information is the standard specification information, a result of determination that the specification information of the tire brand is correct is transmitted to the server 2.

As described above, the inspection worker visually confirms the tire brand of the vehicle, selects the specification information corresponding the tire brand from the plurality of specification information displayed on the liquid crystal display 54 of the mobile inspection terminal 5, and inputs the confirmed contents of the specification information. That is, the inspection worker does not know which of the displayed specification information is the normal specification information. That is, the standard specification information of the tire brand is masked. Accordingly, the inspection worker visually inspects a part to be inspected securely without a preconceived notion and selects specification information according to visually inspected contents. Accordingly, it can be prevented as much as possible to erroneously determine whether or not the tire brand is accepted due to a preconceived notion as compared with a system for simply recording whether or not the tire brand is accepted. That is, it can be prevented to erroneously accept the tire brand regardless of the fact that it is not correct. With the system of the embodiment, the inspection accuracy can be improved by preventing an erroneous determination of acceptance and unacceptance.

Further, in the case in which the part to be inspected is, for example, a "washer tank", when an inspection standard is received from the server 2, it is determined that the inspection standard is a "measured value". In this case, the inspection standard value of the section to be inspected of a vehicle is set to the inspection master database 11. The inspection standard value is set within, for example, an allowable range.

Accordingly, when an inspection worker clicks a button corresponding to the inspection standard value on the inspection item screen displayed on the liquid crystal display 54, the inspection standard value is received from the server 2. Then, a measured value input screen is displayed on the liquid crystal display 54.

The inspection worker visually reads the inspection standard value of the "washer tank" and inputs the read value on the measured value input screen displayed on the liquid crystal display 54. The mobile inspection terminal 5 determines whether or not the input value is within the allowable range of the inspection standard value. When the input value is within the allowable range of the inspection standard value, it is determined that the "washer tank" is correct and transmits the result of determination to the server 2.

As described above, the inspection worker visually reads the inspection standard value of the "washer tank" of the vehicle and inputs the read value on the measured value input screen displayed on the liquid crystal display 54 of the mobile inspection terminal 5. That is, the inspection worker does not know the inspection standard value, in other words, the inspection standard value is masked. Accordingly, the inspection worker visually reads the inspection standard value of the "washer tank" securely and correctly inputs the read value. Accordingly, it can be prevented as much as possible that acceptance or unacceptance of the value of the "washer tank" is erroneously determined due to a preconceived notion as compared with a system for simply recording whether or not the inspection standard value of the "washer tank" is accepted. That is, it can be prevented that the inspection standard value of the "washer tank" is accepted regardless of the fact that it is outside of the allowable range. With the system of the embodiment, the inspection accuracy can be improved by preventing an erroneous determination of acceptance and unacceptance.

Further, when a label, on which a barcode is printed, is bonded to a section to be inspected, the barcode is read by the barcode reader 57. When the part to be inspected is provided with the barcode, a "barcode (ten keys) input" is designated as an inspection result input segment and set to the inspection master database 11. When a button corresponding to the section to be inspected, to which the barcode input is set, is clicked, a barcode input dialog is displayed on the liquid crystal display 54 of the mobile inspection terminal 5.

In this state, an inspection worker reads the barcode from the label bonded on the section to be inspected with the barcode reader 57 held in his or her hand. Since the barcode in this case shows a part number by itself, whether or not the part is a correct part for a vehicle being manufactured can be directly determined. Parts can be easily inspected by using barcodes. In other words, the inspection accuracy can be improved while reducing an inspection time.

As described above, sections to be inspected are inspected in the respective processes, and the sections which have passed the inspections are transferred to a next process. When there is a section which must be repaired, it is repaired in the process and then transferred to the next process.

It should be noted that the mobile inspection terminals are used as inspection terminals and the communication is executed by the radio communication system through the server 2 and the access points 4 in the embodiment. However, the present invention is by no means limited thereto and stationary inspection terminals which are wired through the server 2, the LAN, and the like may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle inspection management system, comprising:
    a server for use in a vehicle manufacturing line, the server being provided with a database having inspection standard information stored therein, the inspection standard information including standard specification information, out-of-standard specification information, and measured value information; and
    inspection terminals which communicate with the server and which are used in a plurality of inspection processes being executed in the vehicle manufacturing line,
    wherein the server comprises:
    an inspection information transmission section including means for reading out the inspection standard information of a vehicle from the database, means for checking whether the inspection standard information is the standard specification information or the measured value information, and means for transmitting the standard specification information and the out-of standard specification information of the vehicle to one of the inspection terminals, and
    each of the inspection terminals comprises:
    a display including,
        a first display section configured to display an inspection item screen on the display, and
        a second display section configured to, when the standard specification information and the out-of-standard specification information is received from the server, display a specification information selection screen including the standard specification information and the out-of-standard specification information on the display, simultaneously in a state in which an indication that the specification information is standard or out-of-standard is not displayed, and when the measured value information is received from the server, display an inspection information input screen on the display in a state in which the received measured value information is masked; and
        a notification section configured to determine, when an inspection worker selects one of the displayed standard specification information and the out-of-standard specification information, as a result of inspection of a section to be inspected, whether or not the selection performed by the inspection worker is acceptable or unacceptable, and to notify the server of a result of determination, and when the inspection worker inputs on the screen a measurement value obtained visually from a section to be inspected, whether or not the section is accepted based on the result of the visual measurement value and notifying the server of a result of determination.

2. The vehicle inspection management system according to claim 1, wherein the inspection terminal comprises a barcode reader, and the result of inspection is input by reading a barcode attached to a part to be inspected with the barcode reader.

3. A vehicle inspection management method by using:
    a server for use in a vehicle inspection manufacturing line, the server being provided with a database having inspection standard information stored therein, the inspection standard information including standard specification information, out-of-standard specification information, and measured value information; and
    inspection terminals which communicate with the server and which are used in a plurality of inspection processes being executed in the vehicle manufacturing line,
    wherein the method comprises:
    reading out the visual inspection standard information of a vehicle from the database, checking whether the inspection standard information is the standard specification information or the measured value information, and transmitting the standard specification information and the out-of standard specification information, or the measured value information of the vehicle to one of the inspection terminals;
    displaying an inspection item screen on a display of one of the inspection terminals, the display including a first display section configured to display an inspection item screen on the display, and a second display section which is configured to,
    when one of the inspection terminals receives the standard specification information and the out-of-standard specification information from the server, displaying a specification information selection screen including the standard specification information and the out-of-standard specification information on the display, simultaneously in a state in which an indication that the specification information is standard or out-of-standard is not displayed;
    determining, when an inspection worker selects one of the displayed standard specification information and the out-of-standard specification information, as a result of inspection of a section to be inspected, whether or not the selection performed by the inspection worker is acceptable or unacceptable, and when the measured value information is received from the server, display an inspection information input screen on the display in a state in which a the received measured value information is masked; and
    notifying the server of a result of determination, when an inspection worker selects one of the displayed standard specification information and the out-of-standard specification information, as a result of inspection of a section to be inspected, whether or not the selection performed by the inspection worker is acceptable or unacceptable, and when the inspection worker inputs on the screen a measurement value obtained visually from a section to be inspected, whether or not the section is accepted based on the result of the visual measurement value and notifying the server of a result of determination.

4. The vehicle inspection management method according to claim 3, wherein the inspection terminal comprises a barcode reader, and the result of inspection is input by reading a barcode attached to a part to be inspected with the barcode reader.

5. The vehicle inspection management system, according to claim 1, wherein the inspection terminals communicates with the server through a LAN.

6. The vehicle inspection management method, according to claim 3, wherein the inspection terminals communicates with the server through a LAN.

* * * * *